March 16, 1937.  V. H. SEVERY  2,073,812
MUSICAL VIBRATION APPARATUS
Filed Jan. 25, 1935  4 Sheets-Sheet 1

Inventor
Victor H. Severy
By Lyon & Lyon
Attorneys

March 16, 1937. V. H. SEVERY 2,073,812
MUSICAL VIBRATION APPARATUS
Filed Jan. 25, 1935 4 Sheets-Sheet 2
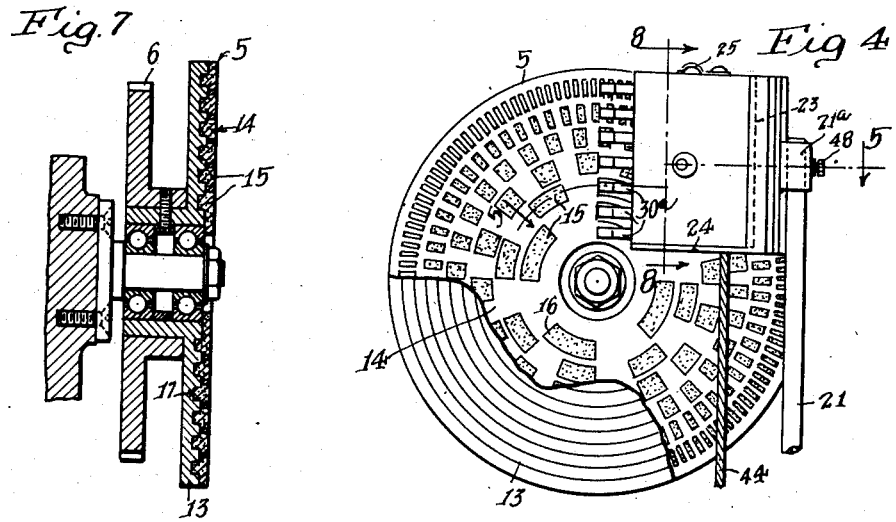
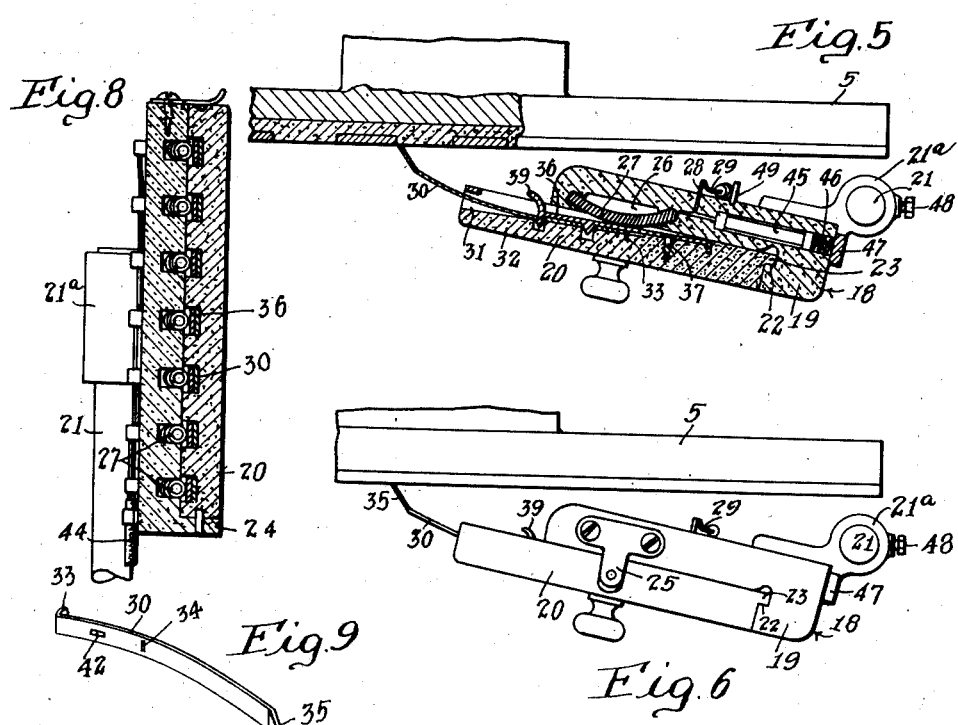
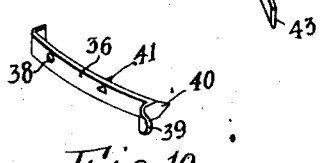
Inventor
Victor H. Severy
By Lyon & Lyon
Attorneys

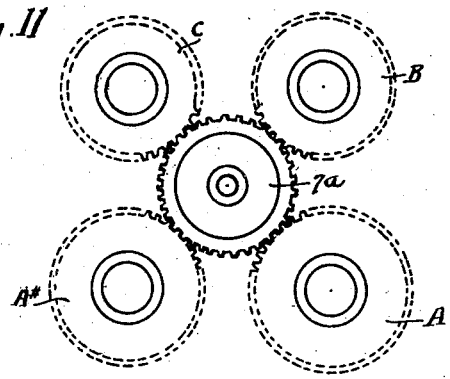
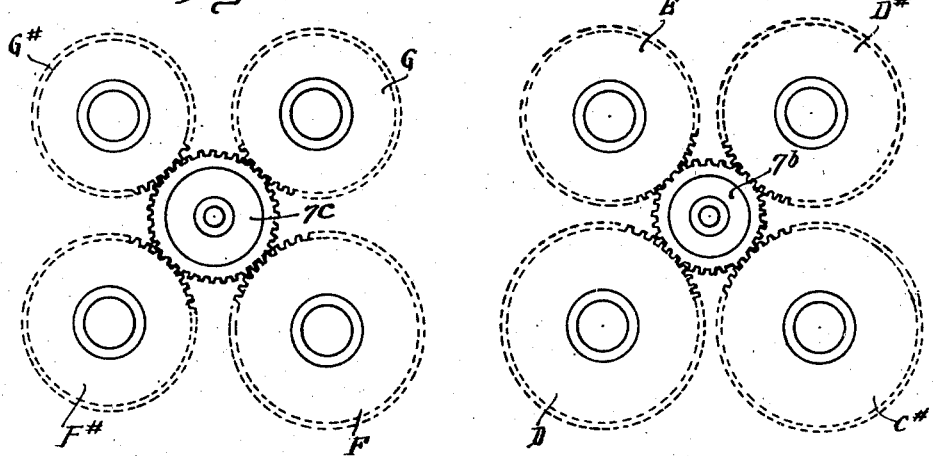
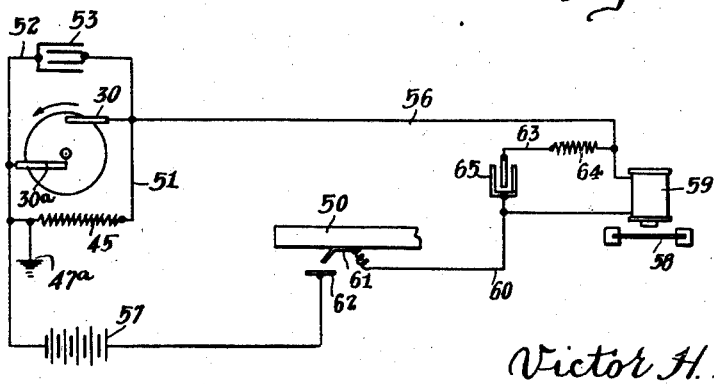

March 16, 1937.  V. H. SEVERY  2,073,812
MUSICAL VIBRATION APPARATUS
Filed Jan. 25, 1935  4 Sheets-Sheet 4
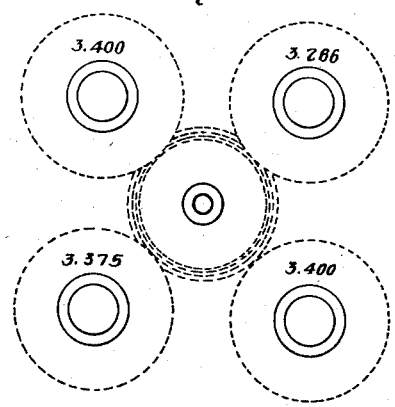
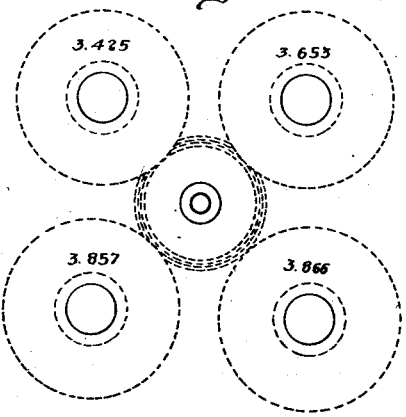
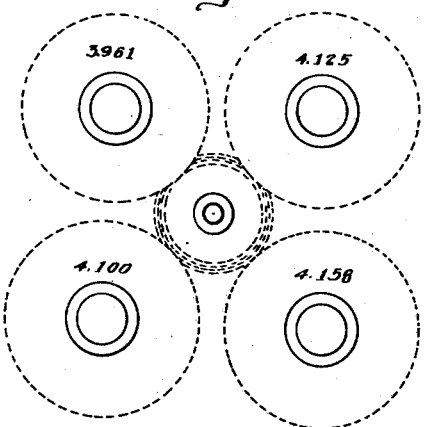
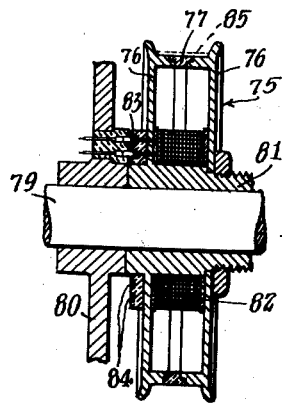
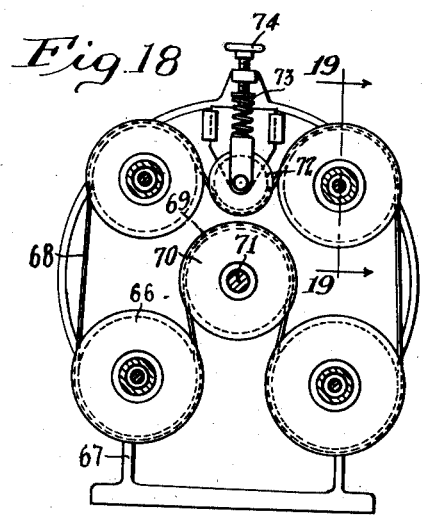
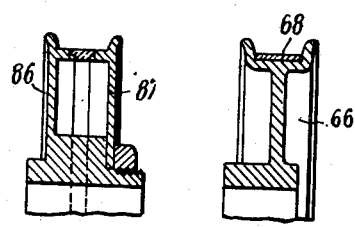
Inventor
Victor H. Severy
By Lyon & Lyon
Attorneys Patented Mar. 16, 1937

2,073,812

UNITED STATES PATENT OFFICE 2,073,812

MUSICAL VIBRATION APPARATUS

Victor H. Severy, Los Angeles, Calif.

Application January 25, 1935, Serial No. 3,498

10 Claims. (Cl. 84—1)

This invention relates to vibration apparatus, and particularly concerns the construction of apparatus for producing and controlling vibrations used for any purpose, either in sonorous or non-sonorous bodies. In accordance with the invention, the apparatus includes a mechanism having a plurality of rotary members for making and breaking circuits at definite frequencies. By this means, vibrations at different frequencies can be imparted to bodies of any kind for various purposes. In the preferred type of the make-and-break mechanism, the mechanism is so constructed that the breaking and re-establishing of the circuits is accomplished at frequencies corresponding to a musical scale. This enables the make-and-break mechanism to be used for vibrating sonorous bodies to produce musical notes.

Heretofore, rotary members have been employed for developing impulses in circuits. In one type of mechanism for this purpose, a plurality of relatively stationary electromagnets have been employed, which are located near the path of electromagnets, or magnetic elements which inductively produce impulses in coils on the poles, and these coils have been connected with circuits for producing such impulses at different frequencies.

Another type of make-and-break mechanism has been employed, in which rotary contact members are provided, having circumferentially disposed equidistant contacts separated by insulation, and which make contact with relatively fixed brushes as the rotary contact members revolve.

One of the objects of this invention is to provide vibration apparatus having a make-and-break mechanism of simple construction, which will avoid the necessity for employing poles with coils, such as referred to above, and which is so constructed that all the rotary contact members can be constructed alike. By having the rotary contact members so constructed alike, the construction of the machine is greatly simplified and the contact members are made interchangeable with each other. In spite of the fact that the rotary contact members are of like construction, it is possible, in accordance with my invention, to utilize these contact members for developing impulses in circuits at frequencies corresponding to a musical scale, thereby enabling the make-and-break mechanism to be employed in connection with key-controlled electrically operated musical instruments.

A further object of the invention is to produce a rotary contact member of very simple construction, which enables it to be manufactured by employing a simple punched face plate to enable a plurality of concentric contact "rings" to be formed, in which equidistant circumferentially disposed insulating spots alternate with conductive spots on the "ring"; also to give such a rotary contact member a construction which enables the insulating spots to be readily applied in such a way that they lock themselves into the face plate of the contact member.

A further object of the invention is to improve the means for mounting and clamping the contact brushes that cooperate with the different contact "rings" of the rotary contact members.

In one embodiment of the invention, the contact members are mounted to rotate on parallel axes, and one of the objects of the invention is to provide simple means avoiding the use of meshing gears for driving the contact members accurately at predetermined speeds to enable them to make and break the circuits at predetermined frequencies, and if desired, at frequencies that correspond to the frequencies of a musical scale.

A further object of the invention is to provide simple vibration apparatus capable of being actuated through the medium of impulsive electric currents, in which the impulses have definite frequency.

Further objects of the invention will appear hereinafter.

The invention consists in the novel parts and combination of parts to be described hereinafter, all of which contribute to produce an efficient vibration apparatus.

A preferred embodiment of the invention is described in the following specification, while the broad scope of the invention is pointed out in the appended claims.

In the drawings:

Figure 4 is a front elevation partly broken away and illustrating more in detail one of the rotary contact members, together with a brush holder, and illustrating the construction of the contact member and the arrangement of brushes with respect to the same.

Fig. 5 is a horizontal section taken about on the line 5—5 of Fig. 4, and further illustrating the details of the construction of the rotary contact member, and the brush holder and brushes. In this view, a portion of the contact member is shown in cross section, and a portion of the contact member is broken away.

Fig. 6 is a plan of the parts shown in Fig. 4, with a portion of the contact member broken away.

Fig. 7 is a vertical section taken through one of the rotary contact members and its corresponding driving gear, and illustrating the manner in which the contact member and gear are mounted and supported for rotation; a portion of the frame of the machine is indicated broken away.

Fig. 8 is a vertical section taken about on the line 8—8 of Fig. 4, upon a somewhat enlarged scale, and passing through the brush holder, certain parts being broken away.

Fig. 9 is a perspective of one of the brushes removed from the brush holder.

Fig. 10 is a perspective of a keeper corresponding to each brush, which is employed to assist in detachably connecting the brushes in the brush holder.

Fig. 11 is a diagrammatic view illustrating an arrangement of gearing for driving the rotary contact members at different speeds to enable contact members of like construction to be employed for producing impulse frequencies corresponding to the notes of the musical scale.

Fig. 12 is a view similar to Fig. 11, but indicating the gearing employed for producing other notes of the scale.

Fig. 13 is a view similar to Figs. 11 and 12, and indicating the gearing for producing other notes of a musical scale.

Fig. 14 is a diagrammatic view illustrating a circuit arrangement, which I may employ in connection with my apparatus.

Figs. 15, 16 and 17 are diagrammatic views indicating another gearing arrangement in which the rotary contact members are not driven in groups from a single driving gear, but in which there is a common driving shaft with a separate gear on it corresponding to each rotary contact member.

Fig. 18 is a vertical section, and may be regarded as a diagrammatic view illustrating another embodiment of means for driving the rotary contact members, which avoids the necessity for employing gear wheels of any kind.

Fig. 19 is a vertical section upon an enlarged scale, taken about on the line 19—19 of Fig. 18, and further illustrating details of the driving means illustrated in Fig. 18.

Fig. 20 is a vertical section similar to Fig. 16, but illustrating another embodiment of the driving pulley, certain parts being broken away.

Fig. 21 is a view similar to Fig. 20, and illustrating another type of driving means.

Figure 1:
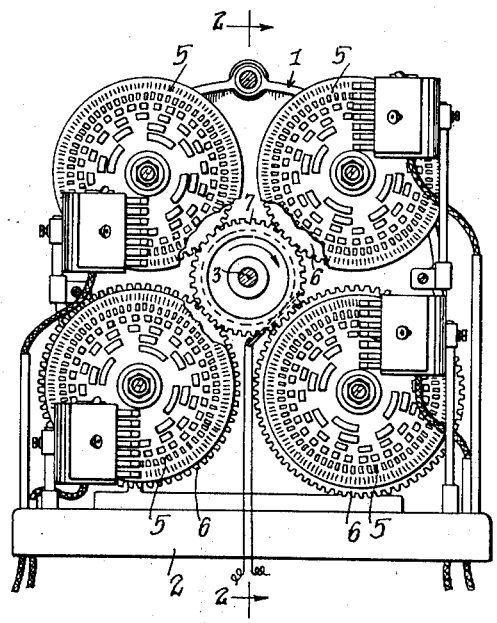
Figure 1 is a section through a make-and-break mechanism embodying my invention, certain parts being broken away. This section is taken on the line 1—1 of Fig. 2, but shows many parts in elevation.
Figure 2:
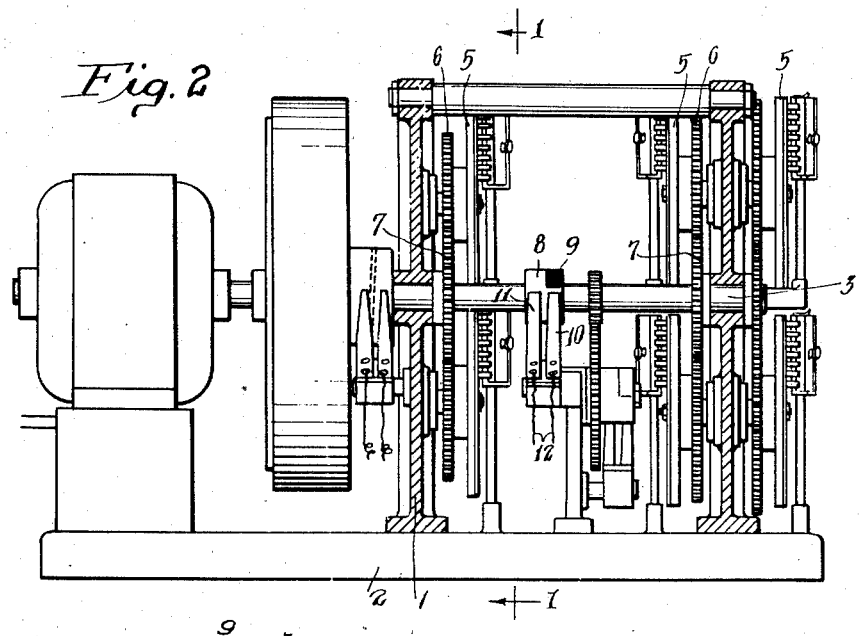
Fig. 2 is a vertical section taken about on the line 2—2 of Fig. 1, but showing certain parts in elevation, and illustrating the means which I prefer to employ for driving such make-and-break apparatus.
Figure 3:
Fig. 3 is a fragmentary view, and is a perspective illustrating a make-and-break unit, which I prefer to employ in the make-and-break mechanism for producing the electric impulses at the lowest rate, for example, at a frequency corresponding to the lowest note of a musical scale.

Referring more particularly to the parts, and especially to Figs. 1, 2 and 3, I indicates a frame for the make-and-break apparatus, including a base 2. This frame supports a main shaft 3 for driving all of the rotary contact members indicated collectively by the numeral 5. These rotary contact members are constructed alike, and they are all mounted in the frame for rotation on parallel axes. These contact members are preferably of disc-form, and are illustrated in detail in Figs. 4 and 7. In the embodiment illustrated in Figs. 1 to 3, the make-and-break apparatus is so constructed that it is capable of producing impulses in different circuits at different frequencies corresponding to the frequency of the notes of a musical scale. In order to accomplish this, I provide three groups of the contact discs 5, each group containing four discs, all of which are driven from a common gear. This is illustrated in Fig. 2, in which each disc 5 is provided with a corresponding gear wheel, said gear wheels being indicated collectively by the reference numeral 6. Each gear wheel 6 meshes with a driving gear wheel 7 on the main shaft 3, corresponding to that group of discs. The different gears 6 are of different diameters, so that they will be driven at a different number of revolutions per minute. As illustrated in Fig. 2, one of the groups of discs 5 is located toward the left of the machine, and two other groups are located at the other end of the machine.

In order to make and break a circuit corresponding to the lowest note of the musical scale, for example, the lowest "C" note, I provide means driven directly by the main shaft 3 to break this circuit, and I drive this shaft at 960 revolutions per minute. On this shaft I provide a rotary contact collar 8, which is not of disc-form, and is not typical of the machine like the rotary contact discs 5. This collar has an insulating segment 9 that extends half way around the circumference of the collar, and is in line with a simple brush 10, while the metallic body of the collar 8 is in contact with the simple brush 11. These brushes are connected by wires 12 into the circuit for producing the lowest "C" frequencies. When both brushes are in contact with the metal body of the collar, the circuit is closed, and an impulse flows through it. Whenever the insulation 9 is in contact with the brush 10, the circuit is broken.

In Figs. 11 to 13 inclusive, I illustrate diagrammatically the gearing arrangement for driving all of the contact discs 5. In Fig. 11, "C" indicates specifically, the gear wheel that meshes with a central gear 7ª. The gear wheel 7ª has 84 teeth, and the gear wheel "C" has 84 teeth, so that the disc corresponding to this gear "C" will produce the "C" note of the scale, that is to say, the "C" note nearest to the note produced by the contact member 8, and the contact member driven by this gear, will also produce all the "C" octaves of the scale, as will be explained hereinafter. The gear wheel "B" in Fig. 11, has 89 teeth, and the rotary contact member driven by it, will produce all the B notes of the scale. The gear A# of Fig. 11 has 94 teeth, and the disc driven by it will produce all the A sharps of the scale. The gear A has 100 teeth, and the disc driven by it will produce all of the A notes of the scale.

Referring to Fig. 12, the main driving gear 7ᵇ has 69 teeth, and the gear wheels E, D#, D, and C# respectively, have 100 teeth, 116 teeth, 123 teeth, and 130 teeth, and when these gears are driven during the operation of the machine, their corresponding discs will produce all the E notes, D# notes, D notes, and C# notes of the scale.

Likewise, in Fig. 13, the central gear 7ᶜ has 80 teeth. The gears of this group, namely, G#, G, F# and F, respectively, have 101 teeth, 107 teeth, 113 teeth, and 120 teeth, so that these gears will drive their corresponding discs to produce all the G' notes, G notes, F' notes, and F notes of the scale.

Instead of driving all of the four gears of each group by a common central gear, such as the three gears 7ª, 7ᵇ, and 7ᶜ, I may drive each gear by a separate gear on the main shaft. This arrangement is indicated in Figs. 15 and 17. In such a case, the relative rotary speeds of the different discs may be as indicated by the legends in the drawings, the higher notes of the scale corresponding to the higher numbers associated with the different gears.

Referring now particularly to Figs. 4 to 7, each rotary disc 5 is composed of a body 13, which may be formed of metal if desired. This body is formed with a hub enabling it to be attached to its corresponding gear 6 for rotating it, and this hub is preferably mounted on ball bearings as indicated in Fig. 7. Each contact disc also includes a face plate 14 which is formed of any suitable metal that is a good conductor. The outer face of this face plate is constructed so that it will provide a plurality of circumferentially disposed rings of equidistant insulating spots or pads 15. The innermost "ring" contains four of these pads disposed equidistant from each other. These insulation spots or pads are preferably set in the face plate 14 by providing the face plate with a plurality of equidistant openings 16, the side edges of the openings being disposed radially from the axis of the disc, and the other two edges of the openings being located on circumferential lines with the axis of the disc as a center. Each "ring" on the contact disc has twice as many insulation pads as the adjacent inner "ring", the result of which is that each ring will make and break its corresponding circuit at a frequency which is twice that of the next adjacent inner ring. This enables each ring to cooperate to produce the first octave of the note produced by the adjacent inner ring, and in this way, all of the octaves of the scale for the particular note produced by the disc, will be produced on that disc.

The face of each body 13 is provided with a plurality of circumferential grooves 17, which are in alignment with a corresponding "ring" of openings 16. In forming the disc, the insulating material that forms the spots or pads 15, is forced down into the opening so that some of the material is squeezed in a circumferential direction into the grooves 17 and under the inner face of the face plate 14. When this plastic insulation material hardens, the pads or insulation spots will all be locked in their openings. After the insulation has hardened, it should be cut down so that the faces of the pads are flush with the outer face of the face plate.

Corresponding to each rotary disc, I provide a brush holder 18 (see Fig. 5), which includes a body 19 and a removable brush carrier 20, which is detachably secured on the body. This body 19 is secured to a stanchion 21 adjacent its corresponding disc. Any suitable means may be employed for detachably securing the carrier to the body 19. In the present instance, I cut away one side face of the body, so as to form a transverse under-cut shoulder 22, and the inner edge of the carrier has a tongue 23 to engage in this shoulder. A portion of the face of the holder body 19 is left in place, so as to form an end wall 24 (see Fig. 4) at the bottom edge of the cavity that is cut in the face of the body. This part 24 forms a ledge or shelf to support the lower edge of the carrier. The upper edge of the carrier is engaged by a spring clip 25 attached to the upper edge of the body (see Fig. 6).

The inner side of the body is provided with a chamber 26 (see Fig. 5), and in this chamber I provide a plurality of resilient bowed members or bows 27, which are preferably in the form of coil springs of good conductive material. The ends of these springs are received in sockets at each side of the chamber, so that the convex side of each spring is disposed outwardly. The inner end of each body 27 is attached to a terminal 28 that extends out through the outer face of the body, where it is connected to a circuit wire 29 corresponding to that bow 27. These bows 27 are contact members for making electrical contact with the brushes indicated collectively by the numeral 30. The brushes are carried in the carrier 20, and are removably mounted. In order to accomplish this, I prefer to provide the carrier with a plurality of side sockets 31 extending in from its edge 32 that projects toward the disc 5. Each brush consists of an elongated strip of light sheet metal, and the rear end of each brush is bent up to form a toe 33, that is received in a small socket formed in the inner face of the carrier. Toward its outer end, but at an intermediate point on its length, the brush is formed with an eye or opening 34, through it, and beyond this point the brush is curved and projects toward the disc, being provided with an inclined tip 35, which is preferably formed of silver or similar highly conductive material, welded or otherwise secured to the end of the brush. Corresponding to each brush there is a small metal keeper 36, shown in detail in Fig. 10. This keeper is also a bar of thin metal, with its inner end anchored in the inner face of the carrier. The means for this purpose includes a small screw 37 applied through an opening or eye 38 in the keeper. The outer end of the keeper has an outwardly bent ear 39, which can be pressed outwardly by one's finger, to detach the corresponding brush. Opposite this ear 39 the keeper is provided with a tapered point or spur 40, that projects through the opening 34 in the brush. At another point the inner side of the keeper is provided with a tapered point or spur 41, that projects through another eye 42 formed in the brush near its inner end. When the brush carried is in place, the outer bowed faces of the contact springs 27, press yieldingly against the inner face of the corresponding keeper, and in this way good electrical contact will be made with the brush, the side of which lies flat against the flat side of the keeper.

It will be evident that the carrier can be readily removed from the body 19 of the holder, and after it has been removed, the brushes can readily be removed for replacement or repair.

Each brush tip 35 has a contact face 43, (see Fig. 8), that tapers transversely of the brush. When the brush is put in place, the wide end of this contact face 43 is disposed toward the outer edge of the disc, and the side edges of the tapered face 43 should lie along radial lines from the center of the disc.

The wires 29 from the cable, are brought into the brush holder 18 through a cable 44, (see Fig. 4). Each terminal 28 is connected laterally to a high resistance 45, set opposite to it in the back of the brush holder, and connected through a spring 46 at the back, to a metal bar 47 that is grounded to the frame; that is to say, it is mounted on the stanchion 21 because it is integral with a metal sleeve 21ª that carries the brush holder, and is adjustably mounted on the upper end of the stanchion by means of a set screw 48 (see Fig. 4). The wires from the cable 44 extend across the inner face of the body 19 and along the guide rail 49 set in the back wall, (see Fig. 5). The current comes in a wire like the wire 29, and passes to the innermost brush, indicated specifically by the reference numeral 38. This brush is always in contact with the face plate of the disc, and if any other of the brushes 30 is in contact with the metal face plate, it will receive current flowing through the face plate from the brushes 30a. Of course, whenever an insulation spot or pad 15 passes under a brush, the current is broken. This produces the impulses at the frequency corresponding with that brush.

A circuit corresponding to a single brush 30, is illustrated in Fig. 14. This diagram includes a key such as a piano key 50, closing the circuit corresponding to that key and note. And the circuit corresponding to each brush, includes a bypass 51 including the resistance 45 already referred to in connection with Fig. 5. Beyond this resistance the bypass is connected to a ground 47a, which corresponds to the rail 47. A second bypass 52 is provided as indicated in the diagram, that passes through an electrolytic cell or condenser 53. This arrangement prevents sparking, and the effect is to give a quick building up of the voltage in the circuit, as indicated at the line 54 of Fig. 25, and gives a gradual falling off of the voltage as indicated by the line 55 of that diagram.

A circuit 56, indicated in Fig. 14, includes a source of electromotive force 57, and this circuit indicates the vibrator 58 actuated by pulsations developed in the coil of an electromagnet 59 adjacent to the vibrator, and connected by a conductor 60 with the contacts 61 and 62 at the key 50. The electromagnet may be provided with a bypass 63, including a resistance 64, and an electrolytic cell or condenser 65.

If it is desired to drive the discs without employing the gear wheels, I may provide a construction such as illustrated in Fig. 18, in which I provide a belt pulley 66 rigid with a corresponding disc. These belt pulleys are all mounted for rotation on parallel axes in the frame 67, and are driven in unison by a belt 68 that runs over the faces of these pulleys. This belt forms a loop 69 in engagement with the face of a driving pulley 70 on the driving shaft 71. If desired, all of the sets of pulleys and discs can be grasped in a circumferential arrangement, using a single belt or driving gear to drive all of them.

A belt tightener 72 is provided for taking up slack. This belt tightener may comprise a pulley pressed inwardly against the side of the belt by a coil spring 73, provided with adjusting screws 74 back of it to adjust the tension of the spring.

If desired, an ordinary leather belt may be provided, running on the pulleys, but such a drive might be objected to on account of the possibility of slippage on the pulleys, which might vary the frequencies and interfere with the perfect functioning of the contact mechanism, if employed for operating a musical instrument. In order to provide a more accurate pulley drive, I may provide the construction illustrated in Fig. 19, in which the pulley 75 is composed of two metal side plates 76, which are separated by insulation 77 at the rim, and mounted on the spindle 79. At the outer side removed from the frame 80, a sleeve 81 is provided, to which the disc corresponding to that pulley is attached.

The hub of the pulley is surrounded by a coil 82 that is energized by an electric current that passes in and out of the coil through insulated contact brushes 83 running on contact rings 84 set in the adjacent side of the pulley. In this case, the belt 85, indicated by dotted lines in Fig. 19, is formed of a thin strip of magnetic metal such as steel. The side plates of the pulley become magnetized by the current passing in the coil, and attract the metal belt so as to prevent slippage.

If desired, the belt pulley may be formed of a permanent magnet as indicated in Fig. 20, that is to say, one side plate 86 of the pulley would be magnetized with one character of magnetization, and the opposite plate 87 would be magnetized oppositely.

Referring again to Figs. 11 to 13 inclusive, which show the gearing diagrams, and which indicate the different notes of the scale which are produced by the different discs, it should be stated that the disc C♯ will produce the 2nd, 14th, 26th, 38th, 50th, and 62nd notes of the scale. The disc D will produce the 3rd, 15th, 27th, 39th, 51st, and 63rd notes of the scale. The D♯ disc will produce the 4th, 16th, 28th, 40th, 52nd, and 64th notes of the scale, and so through the entire scale. In other words, the E disc would produce the 5th note of the scale, and all its octaves, including the 65th note; the F disc would produce the 6th note of the scale and all its octaves, including the 56th note of the scale; the F♯ disc would produce the 7th note and all its octaves, including the 67th note of the scale; the G disc would produce the 8th note of the scale and all its octaves, including the 68th note of the scale; the G♯ disc would produce the 9th note of the scale and all its octaves, including the 69th note of the scale; the A disc would produce the 10th note and all its octaves, including the 70th note of the scale; the A♯ disc would produce the 11th note and all its octaves, including the 71st note of the scale; the B disc would produce the 12th note of the scale and all its octaves, including the 72nd note of the scale; the C disc would produce the 13th note and all its octaves, including the 73rd note of the scale. In connection with these discs and the notes which they produce, it should be remembered that the lowest C note on the scale is produced, not by a disc, but by the shaft 3, as indicated in Figs. 2 and 3.

When the brushes are in place on the disc, their outer edges are all in alignment with a radial line from the axis of the disc, as indicated in Fig. 4.

I claim:

1. In a vibration apparatus, the combination of a frame, a rotary contact disc mounted on the frame having a ring thereon composed of circumferentially disposed insulation spots alternating with metallic conductive spots, the forward and rear marginal lines of said insulation spots being disposed on radial lines from the axis of rotation of the disc, and a brush cooperating with the disc having a contact tip in engagement with the ring, said contact tip having a contact face having its greatest width toward the margin of the disc and having its side edges disposed substantialy on radial lines from the axis of the disc.

2. In a vibration apparatus for producing impulses in different electric circuits at predetermined frequencies, the combination of a frame, a rotary contact disc mounted in the frame, said disc having a plurality of contact rings composed of equidistant circumferentially disposed insulating spots alternating with metallic conductive spots, the front and rear edges of each insulation spot with respect to the direction of rotation of the disc being located on radial lines from the axis of the disc, a brush holder corresponding to the disc, a plurality of brushes mounted in the brush holder and having tips engaging the disc at the different rings respectively, the tips of said brushes being located in a radial line from the axis of rotation of the disc.

3. In a vibration apparatus for producing impulses in different electric circuits at predetermined frequencies, the combination of a frame, a rotary contact disc mounted in the frame, said disc having a plurality of contact rings composed of equi-distant circumferentially disposed insulating spots alternating with metallic conductive spots, the front and rear edges of each insulation spot with respect to the direction of rotation of the disc being located on radial lines from the axis of the disc, a brush holder corresponding to the disc, a plurality of brushes mounted in the brush holder and having tips engaging the disc at the different rings respectively, the tips of said brushes being located in a radial line from the axis of rotation of the disc, each brush tip having a contact face with its greatest width disposed toward the edge of the disc, and with the side edges of the face disposed on radial lines from the axis of the disc.

4. In a vibration apparatus of the kind described, the combination of a frame, a rotary contact disc mounted in the frame having a plurality of rings composed of circumferentially disposed insulation spots alternating with metallic conductive spots, a multiple brush holder mounted on the frame, said brush holder having a body and a detachable brush carrier removably mounted on the said body, and a plurality of brushes corresponding to the different rings with means for detachably mounting the same in the brush carrier.

5. In a vibration apparatus of the kind described, a multiple brush holder having a body with a chamber formed therein, a plurality of bowed resilient contact members disposed in substantially parallel planes, a brush carrier having an inner face and a plurality of brushes corresponding to the said bowed contact members, means for detachably mounting the same on the inner face of the brush carrier, and means for detachably securing the brush carrier on the brush holder with said brushes extending longitudinally with said bowed springs and in electrical contact therewith.

6. In a vibration apparatus for producing electric impulses in a circuit at a predetermined frequency, a contact device consisting of a disc with a face plate of conductive material, said face plate having a plurality of concentric contact rings formed thereon, each contact ring having a plurality of equidistant openings formed in the said face plate, and insulation located back of the face plate and having insulation spots projecting up so as to fill the said openings and lie flush with the outer face of the face plate.

7. In a vibration apparatus for producing electric impulses in a circuit at a predetermined frequency, the combination of a rotary contact disc having a face plate of conductive material, a brush running constantly in contact with said metallic face plate, said face plate having a plurality of concentric rings formed thereon, each ring composed of a plurality of equidistant circumferentially spaced insulation spots set in the face plate and flush with the face thereof, and a plurality of brushes corresponding to the said rings and cooperating with the contact disc to make and break circuits passing through the first-named brush, and passing in parallel through the other brushes.

8. In a vibration apparatus for producing impulses in different electric circuits at predetermined frequencies, a contact disc having a body of conductive material with a plurality of circumferential grooves formed on the face thereof, a face plate attached to the body over the said grooves and having a plurality of circumferentially disposed equidistant openings through the same in substantial alignment with the said grooves, and insulation filling the said openings and extending into the said grooves at the inner face of the face plate to lock the insulation onto the face plate.

9. In a musical vibration apparatus, the combination of a frame, a plurality of like rotary contact members mounted in said frame, each contact member having a plurality of circumferentially disposed equidistant insulating spots alternating with conductive spots, means for driving each of said rotary contact members at a different speed from the other contact members, said circumferentially disposed insulation spots and conductive spots forming a plurality of contact rings, a brush corresponding to each contact ring, a circuit corresponding to each brush, said brushes cooperating with the contact rings to produce impulses in the circuit at different frequencies that are the same as the frequencies of different notes of a scale, a plurality of electrically actuated vibrators connected into circuit with the said brushes respectively, and switches in said circuits for enabling any certain brush to be connected in circuit with different individuals of the said vibrators.

10. In a musical vibration apparatus, the combination of a frame, a plurality of like rotary contact members mounted in said frame, each contact member having a plurality of circumferentially disposed equidistant insulating spots alternating with conductive spots, means for driving each of said rotary contact members at a different speed from the other contact members, said circumferentially disposed insulation spots and conductive spots forming a plurality of contact rings, a brush corresponding to each contact ring, a circuit corresponding to each brush, said brushes cooperating with the contact rings to produce impulses in the circuit at different frequencies that are the same as the frequencies of the different notes of a scale, a plurality of electrically actuated vibrators connected into circuit with the said brushes respectively, switches in said circuits for enabling any certain brush to be connected in circuit with different individuals of the said vibrators, and means for throwing resistances into the different circuits to control the energy of the vibration of the vibrators.

VICTOR H. SEVERY.